Patented Nov. 27, 1923.

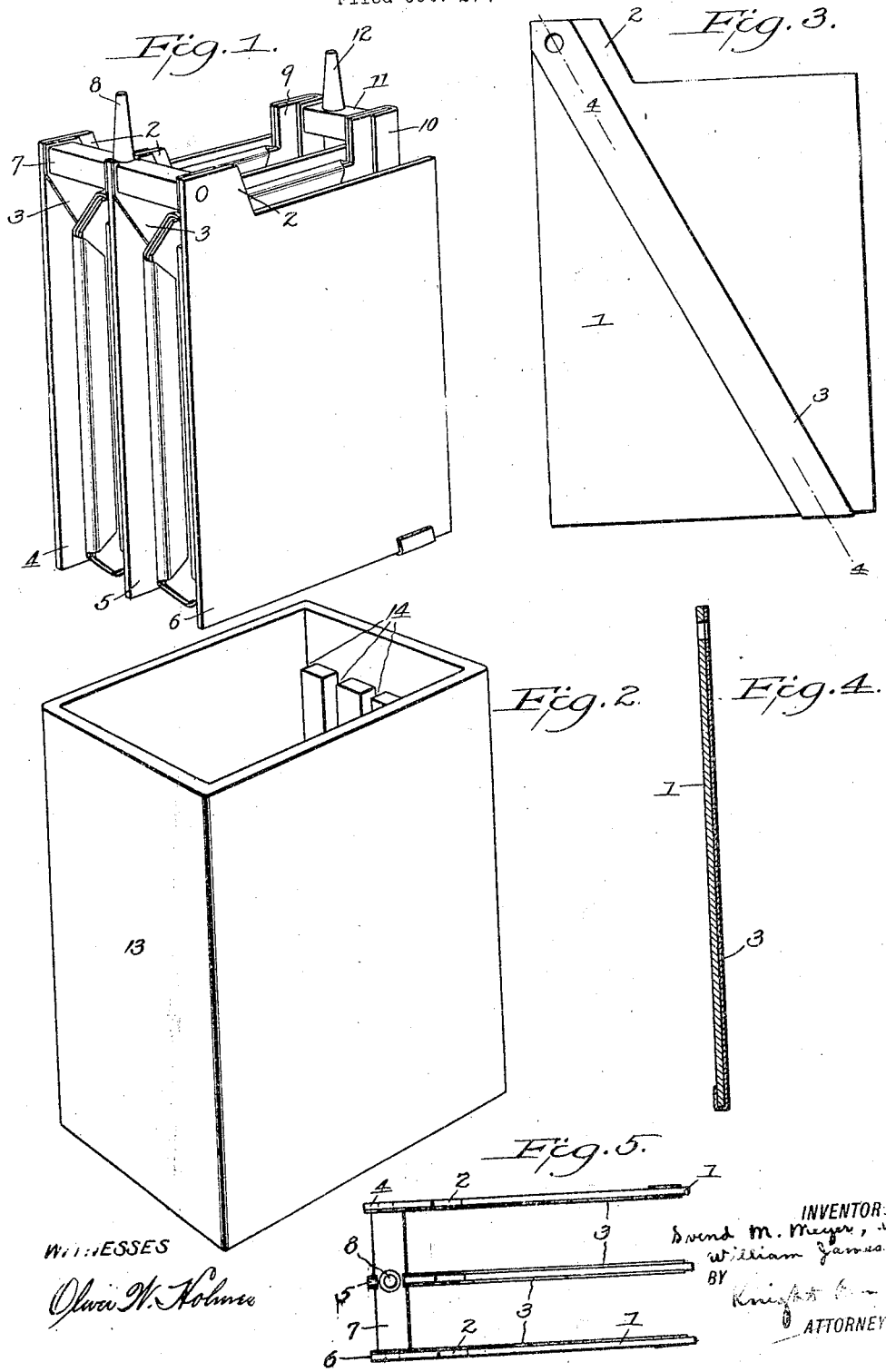

1,475,503

UNITED STATES PATENT OFFICE.

SVEND M. MEYER AND WILLIAM JAMES, OF BROOKLYN, NEW YORK, ASSIGNORS TO MAGNO STORAGE BATTERY CORPORATION, OF NEW YORK, N. Y., A CORPORATION OF DELAWARE.

STORAGE BATTERY.

Application filed October 27, 1921. Serial No. 510,958.

*To all whom it may concern:*

Be it known that we, SVEND M. MEYER and WILLIAM JAMES, citizens of the United States, and residents of the borough of Brooklyn, county of Kings, city and State of New York, have invented certain new and useful Improvements in Storage Batteries, of which the following is a specification.

Our present invention relates to the construction of a storage battery cell and more particularly to the structure of the negative electrode. The object of our invention is to produce a cell that will have a long life and will withstand heavy withdrawals of current without injury to the electrodes.

To accomplish this object we use a solid sheet metal negative electrode of a particular composition and a suitable composite paste positive electrode. We dispense with the usual insulating separators.

In order that our invention may be fully understood, it will first be described in connection with the accompanying drawings and afterwards more particularly pointed out in the annexed claims.

In said drawings:—

Fig. 1 is a perspective view of an assembly of two positive electrodes and three negative electrodes embodying our invention, the cell or container being omitted.

Fig. 2 is a perspective view of the container in which the electrodes are to be mounted.

Fig. 3 is an elevation of the negative electrode.

Fig. 4 is a sectional view of the negative electrode taken on the line 4—4 of Fig. 3.

Fig. 5 is a plan view of three negative electrodes connected for use in a storage battery cell.

Similar numerals refer to similar parts throughout the views.

One of the main features of our storage battery is the negative electrode. This is made in the form of a rectangular sheet metal plate shown at 1, Fig. 3, having on one corner an extension 2 to act as a terminal for electrical connection. The composition of the negative electrode is very important in the action of our storage battery cell. We have found very effective a plate made of an alloy of the following ingredients combined in approximately the proportions given, viz:—50% tin, 25% lead, 17% zinc and 8% antimony. This alloy is the subject matter of our co-pending application, Serial No. 479,801, filed June 23, 1921. To produce the best results in batteries used for different purposes slight modifications may be made in the percentages of the constituents of the alloy. As this material is very strong and stiff the plate 1 may be made thin and we prefer to have it about $\frac{1}{16}$" thick. For certain uses of batteries we employ a soft lead strip 3 running diagonally across the electrode from the terminal 2 to the opposite lower corner. Strip 3 is fastened in electrical contact to the plate 1 by any suitable means, such as riveting at its upper end and folding the lower end over the bottom of the plate 1.

To make up a complete cell a plurality of our negative electrodes are connected as in Fig. 5 where three are shown at 4, 5 and 6. It is to be observed that lead strips 3 are on the inside surface only of electrodes 4 and 6 and on both faces of electrode 5. Connector 7 is of lead and is electrically connected to the terminals 2 of the negative electrodes by, for example, riveting its ends to electrodes 4 and 6 and fastening it at its centre to electrode 5 by a tight fitting tongue and groove. Post 8 is provided on connector 7 for the purpose of leading current to and from the cell.

Two suitable positive electrodes consisting essentially of a paste of active material of some lead compound held in place by a metallic frame such for example as described in our co-pending application, Serial No. 511,395 are mounted as shown in Fig. 1 at 9 and 10. They are properly spaced by the connector 11 so that their centre distances correspond with the centre distances of the negative electrodes. We prefer to have a space of about $\frac{1}{4}$" in the clear between a positive and negative electrode. Post 12 is provided on connector 11 for electrical connection to the positive electrodes of the cell. The negative and positive electrodes are assembled in a suitable container 13, Fig. 2, of hard-rubber or other insulating material. Grooves are formed on both ends of the interior of the container as shown at 14, to serve as spacers to maintain the electrodes in proper relation to each other. After the cell is assembled it is filled with sulphuric acid of a suitable specific gravity.

The action of our alloy negative electrode under heavy demands of current is to build up an electrical resistance at its surface. This is due to the formation of a coating, probably of an oxide of one of its constituents. Therefore, on short circuit, our cell is automatically protected against damage due to excessive discharge current. On opening the short circuit, the coating rapidly disappears and the voltage of the cell returns to normal. We have found that it is not necessary to use the commonly employed insulating separators between our positive and negative electrodes because there is no objectionable buckling of the positive electrodes in our improved battery; consequently the resistance of our cell is low and we can use sulphuric acid of an unusually low specific gravity. We have found that our alloy negative is unaffected during a long period of time if the specific gravity of the acid in the cell does not rise above 1.250 and we prefer to have the gravity of the acid about 1.220 when the cell is fully charged.

In certain conditions of storage battery operation a high rate of charging is necessary. We have found that the lead strip 3, attached to our negative electrode, as shown in Fig. 1 permits of a large current when charging the cell. The strip 3 is of a relatively small area compared to the whole electrode and may be of any shape that will present about the same surface to the electrolyte in a distributed manner. When used, strips 3 need be provided only on those faces of the negative electrodes presented to positive electrodes.

We claim:—

1. A storage battery comprising a positive electrode having active material of lead oxide and a negative electrode consisting of an alloy of tin, lead, zinc and antimony, having a preponderance of tin, whereby a high resistance is built up on the surface of the said negative electrode by the formation of metallic oxide upon the passage of the heavy current.

2. A storage battery described in claim 1, characterized by the fact that the alloy consists of approximately 50% tin, 25% lead, 17% zinc and 8% antimony.

SVEND M. MEYER.
WILLIAM JAMES.